United States Patent
Feng et al.

(10) Patent No.: US 12,368,378 B2
(45) Date of Patent: Jul. 22, 2025

(54) OUTPUT REGULATED BOOST CONVERTER

(71) Applicant: Texas Instruments Incorporated, Dallas, TX (US)

(72) Inventors: Chen Feng, Shanghai (CN); Jian Liang, Shanghai (CN); Weicheng Zhang, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 50 days.

(21) Appl. No.: 17/385,904

(22) Filed: Jul. 27, 2021

(65) Prior Publication Data
US 2023/0029559 A1 Feb. 2, 2023

(51) Int. Cl.
*H02M 3/158* (2006.01)
*H02M 1/00* (2007.01)
*H02M 1/08* (2006.01)

(52) U.S. Cl.
CPC ............. *H02M 3/158* (2013.01); *H02M 1/08* (2013.01); *H02M 1/0022* (2021.05); *H02M 1/0025* (2021.05); *H02M 1/0045* (2021.05)

(58) Field of Classification Search
None
See application file for complete search history.

(56) References Cited

U.S. PATENT DOCUMENTS 5,592,072 A * 1/1997 Brown ....................... G05F 1/62
323/268
5,929,615 A * 7/1999 D'Angelo ............... G05F 1/618
323/224

(Continued)

FOREIGN PATENT DOCUMENTS

EP 2234255 A1 * 9/2010 .......... H02M 3/1563

OTHER PUBLICATIONS

"IEEE Standard Dictionary of Electrical and Electronics Terms," in IEEE Transactions on Power Apparatus and Systems, vol. PAS-99, No. 6, pp. 37a-37a, Nov. 1980, doi: 10.1109/TPAS.1980.319816. keywords: {Dictionaries}, (Year: 1980).*

(Continued)

*Primary Examiner* — Gustavo A Rosario-Benitez
(74) *Attorney, Agent, or Firm* — Valerie M. Davis; Frank D. Cimino

(57) ABSTRACT

In described examples, a boost converter includes an inductor, a voltage input, a current regulator, an intermediate node, a transistor, and a regulation circuit. The inductor has first and second terminals. The voltage input provides an input voltage, and is coupled to the first inductor terminal. The current regulator has current regulator input and output. The current regulator input is coupled to the second inductor terminal. The current regulator allows current to flow from the current regulator input to the current regulator output, and not vice versa. The intermediate node provides a node voltage. The transistor includes a source, a drain, and a gate. The drain is coupled to the current regulator output via the intermediate node. The regulation circuit includes a first regulation input coupled to receive the input voltage, a second regulation input coupled to the intermediate node, and a regulation output coupled to the gate.

19 Claims, 5 Drawing Sheets

(56) References Cited

U.S. PATENT DOCUMENTS

| | | | | |
|---|---|---|---|---|
| 7,084,612 | B2* | 8/2006 | Zinn | H02M 3/158 |
| | | | | 323/284 |
| 7,148,668 | B1* | 12/2006 | Collins | H03K 17/063 |
| | | | | 323/282 |
| 7,683,592 | B2* | 3/2010 | Soude | G05F 1/575 |
| | | | | 323/275 |
| 9,841,776 | B1* | 12/2017 | Bari | G05F 1/56 |
| 10,411,599 | B1* | 9/2019 | Shi | H02M 3/158 |
| 10,666,144 | B1* | 5/2020 | Xie | H02M 3/1582 |
| 2003/0035311 | A1* | 2/2003 | Phadke | H02M 1/4225 |
| | | | | 363/89 |
| 2009/0243568 | A1* | 10/2009 | Nguyen | G05F 1/56 |
| | | | | 323/274 |
| 2010/0127672 | A1* | 5/2010 | Chen | H05B 45/38 |
| | | | | 323/222 |
| 2015/0155783 | A1* | 6/2015 | Li | H03F 3/2173 |
| | | | | 323/271 |
| 2019/0074764 | A1* | 3/2019 | Hu | H02M 3/158 |
| 2019/0363625 | A1* | 11/2019 | Kirchner | H02M 3/158 |
| 2020/0186142 | A1* | 6/2020 | Balaz | H02M 1/08 |
| 2020/0267018 | A1* | 8/2020 | Gupta | H03K 5/003 |
| 2021/0328497 | A1* | 10/2021 | Sun | H02M 3/1588 |
| 2024/0170955 | A1* | 5/2024 | Li | H02H 9/001 |

OTHER PUBLICATIONS

Zarate-Roldan, Jorge et al: "An ultra-low power power management unit with -40dB switching-noise-suppression for a 3x3 thermoelectric generator array with 57% maximum end-to-end efficie", Proceedings of the IEEE 2014 Custom Integrated Circuits Conference, IEEE, Sep. 15, 2014 (Sep. 15, 2014), pp. 1-4, XP032676226.

Park, Inho et al: "A Power Management System Based on Adaptive Low-Dropout Voltage Regulator with Optimal Reference Pre-Compensation Technique", A 2019 IEEE International Symposium On Circuits and Systems (ISCAS), IEEE, May 22, 2021 (May 22, 2021), pp. 1-4, XP033933103.

International PCT Search Report dated Oct. 28, 2022.

* cited by examiner though the intermediate node in the
OUTPUT REGULATED BOOST CONVERTER

TECHNICAL FIELD

This application relates generally to boost converters, and more particularly to an output-regulated boost converter that provides efficient conversion of input voltage to output voltage.

BACKGROUND

A boost converter is a DC-to-DC power converter. Generally, a boost converter steps up (increases) voltage, while stepping down (decreasing) current, from the converter's input to its output. Accordingly, a boost converter's output (load) voltage is greater than its input (source) voltage, and its output current is less than its input current. This relationship emerges from conservation of power: input power equals output power (plus typically relatively small losses such as heat), and power equals voltage times current.

FIG. 1 shows an example circuit diagram of a prior art boost converter 100. A positive terminal of a voltage source 102 is connected to a first terminal of an inductor 104. A second terminal of the inductor 104 is connected to an input of a single pole switch 106 and the anode of a diode 108. The cathode of the diode 108 is connected to a first plate of a capacitor 110 and a first terminal of a resistor 112 (representing a load). A ground 114 is connected to a negative terminal of the voltage source 102, an output of the single pole switch 106, a second plate of the capacitor 110, and a second terminal of the resistor 112.

In a first phase, when the switch 106 is opened, energy stored in the inductor 104 is discharged across the resistor 112, and charges the capacitor 110. In a second phase, when the switch 106 is closed, current across the inductor 104 is increased, and the inductor 104 stores energy by generating a magnetic field. Also, the capacitor 110 discharges across the resistor 112. The diode 108 prevents the capacitor 110 from discharging across the switch 106.

SUMMARY

In described examples, a boost converter includes an inductor, a voltage input, a current regulator, an intermediate node, a transistor, and a regulation circuit. The inductor has first and second terminals. The voltage input provides an input voltage, and is coupled to the first inductor terminal. The current regulator has current regulator input and output. The current regulator input is coupled to the second inductor terminal. The current regulator allows current to flow from the current regulator input to the current regulator output, and not vice versa. The intermediate node provides a node voltage. The transistor includes a source, a drain, and a gate. The drain is coupled to the current regulator output via the intermediate node. The regulation circuit includes a first regulation input coupled to receive the input voltage, a second regulation input coupled to the intermediate node, and a regulation output coupled to the gate.

DETAILED DESCRIPTION

Figure 1:
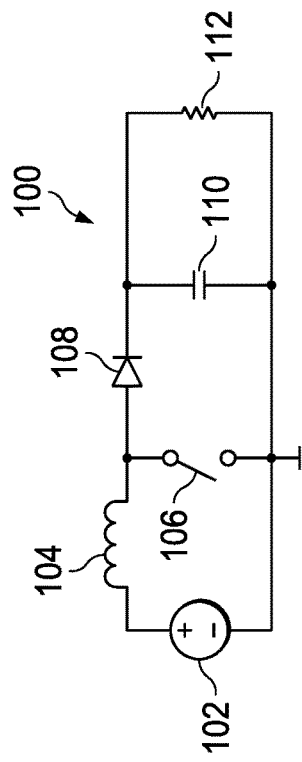
FIG. 1 shows an example circuit diagram of a prior art boost converter.
Figure 2A:
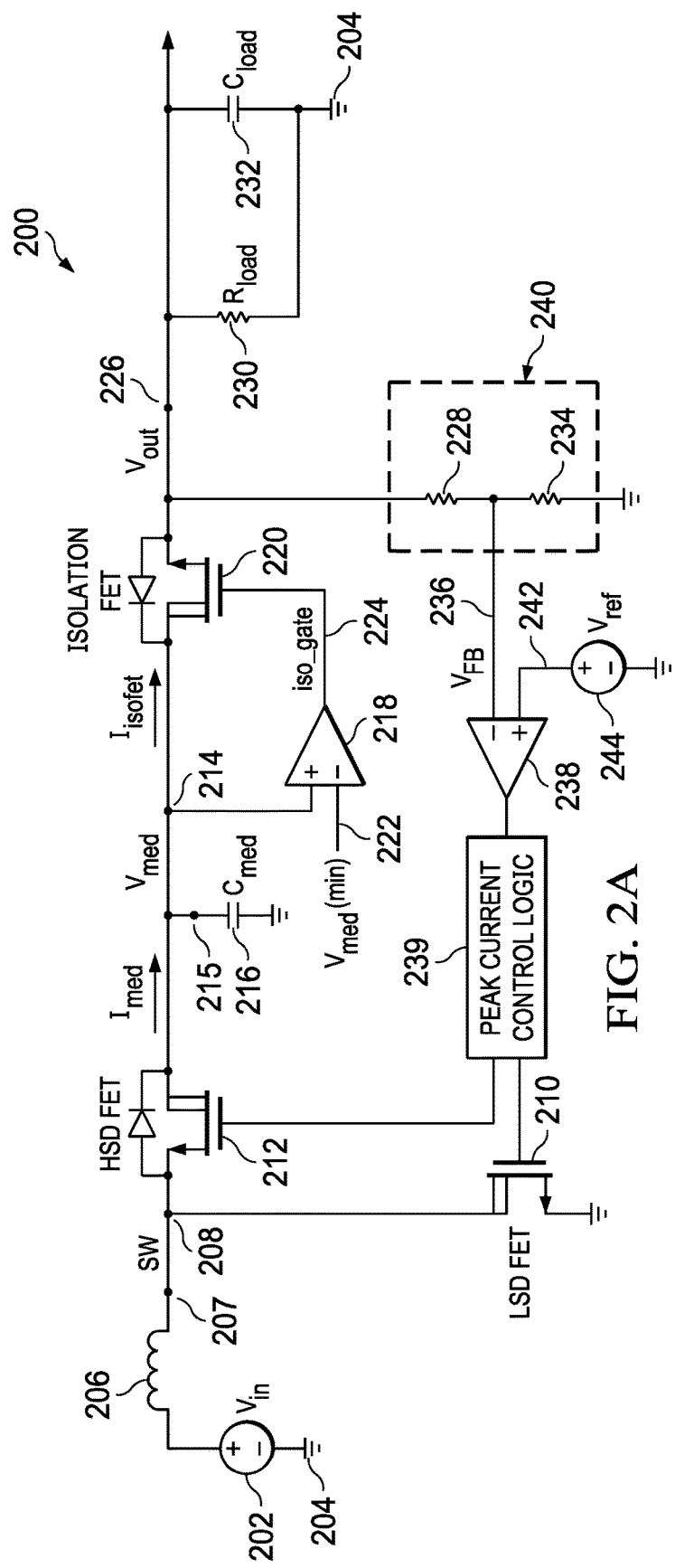
FIG. 2A shows an example circuit diagram of a boost converter with a voltage regulation circuit.

FIG. 2A shows an example circuit diagram of a boost converter 200 with a voltage regulation circuit. In some examples, boost converter 200 is a fixed frequency boost converter, in which a switch controlling transfer of power across an inductor (such as switch 106 in the boost converter 100 of FIG. 1, and the low side n-channel metal oxide semiconductor field effect transistor (LSD FET) 210 in FIGS. 2A and 4) has a constant switching frequency and a variable duty cycle. A voltage source 202 producing an input voltage $V_{in}$ includes a negative terminal connected to a ground 204 and a positive terminal connected to a first terminal of an inductor 206. A second terminal of the inductor 206 is connected to an inductor input terminal 207, which is connected to a switch load node 208 (node SW).

In some embodiments, the boost converter 200 is fabricated on an integrated circuit; except the voltage source 202 and the inductor 206 are external to the integrated circuit. The inductor 206 connects to the integrated circuit at inductor input terminal 207. $R_{load}$ 230 and $C_{load}$ 232 (further described below) may (or may not) also be external to the integrated circuit, and connect to the integrated circuit at the output terminal 226 of the boost converter 200.

Node SW 208 is connected to a drain of the LSD FET 210 and to a source of a high side n-channel MOSFET (HSD FET) 212. (Some FETs are drawn showing respective body diodes. The HSD FET 212 is also referred to herein as a current regulator. The term current regulator refers to the HSD FET's 212 function of regulating current to flow from the inductor input terminal 207 to the intermediate node 214 and not in the opposite direction, as further described with respect to FIG. 2B.) A gate of the HSD FET 212 is connected to a first output of a peak current control logic 239. A drain of the HSD FET 212 is connected to an intermediate node 214. Herein, "med" is used as an abbreviation for intermediate, and refers to an intermediate position within the boost converter 200 relative to $V_{in}$ and to an output voltage $V_{out}$ of the boost converter 200. $I_{med}$ is the current through the source/drain path of the HSD FET 212.

The intermediate node 214 is connected to a capacitor terminal 215, which is connected to a first plate of an intermediate capacitor $C_{med}$ 216. The intermediate node 214 is also connected to a first (positive) input of a regulation amplifier 218 (a differential amplifier), and to a drain of an n-channel isolation MOSFET 220 (isolation FET), which includes the term "isolation" for reasons described below.

$I_{isofet}$ is the current into the source/drain path of the isolation FET 220. A second plate of $C_{med}$ 216 is connected to ground 204. $C_{med}$ 216 filters $I_{med}$, and is used for stability of the inner voltage control loop. Accordingly, $I_{isofet}$ is $I_{med}$ filtered by $C_{med}$ 216. In some examples, $C_{med}$ 216 is an external capacitor and connects to an integrated circuit that includes the boost converter 200 at the capacitor terminal 215.

A second (negative) input 222 of the regulation amplifier 218 receives a minimum value of $V_{med}$, $V_{med}$(min). $V_{med}$(min) is a voltage generated for the purpose of regulating $V_{med}$. Regulation of $V_{med}$ is further described with respect to FIGS. 3, 4, and 6. Generation of $V_{med}$(min) is further described with respect to FIGS. 4, 5A, 5B, and 5C. An output 224 of the regulation amplifier 218 is connected to the gate of the isolation FET 220. The regulation amplifier 218 output 224 provides a voltage iso_gate that controls the isolation MOSFET 220.

A source of the isolation FET 220 is connected to an output terminal 226 of the boost converter 200. The output terminal 226 of the boost converter 200 has output voltage $V_{out}$. The isolation FET 220 isolates the intermediate node 214 and voltage $V_{med}$ from the output terminal 226 of the boost converter 200 and accordingly, that transistor is referenced in this document as an isolation FET. An inner voltage control loop of the boost converter 200 includes the regulation amplifier 218 and the isolation FET 220. The inner voltage control loop isolates $V_{med}$ from the output voltage $V_{out}$ by regulating $V_{med}$, and by controlling the behavior of the isolation FET 220 depending on the conversion ratio M(D) of the boost converter 200. (The symbol M is sometimes used to indicate conversion ratio, and in a boost converter, the conversion ratio is a function of the converter duty cycle D. Accordingly, conversion ratio is represented here by M(D).)

The output terminal 226 of the boost converter 200 is connected to a first terminal of a first voltage divider resistor $R_{div1}$ 228, a first terminal of a load resistor $R_{load}$ 230, and a first plate of a load capacitor $C_{load}$ 232. A second terminal of $R_{load}$ 230 and a second plate of $C_{load}$ 232 are connected to ground 204. A second terminal of $R_{div1}$ 228 is connected to a first terminal of a second voltage divider resistor $R_{div2}$ 234 which has a second terminal connected to ground 204, and to a first (negative) input 236 of an error amplifier 238. The error amplifier 238 is a differential amplifier. Together, $R_{div1}$ 228 and $R_{div2}$ 234 form a voltage divider 240.

The first input 236 of the error amplifier 238 receives a first feedback voltage $V_{FB}$ from the voltage divider 240, that is, the voltage across $R_{div2}$. According to the formula for output voltage of a voltage divider, $$V_{FB} = V_{out} * \frac{R_{div2}}{R_{div1} + R_{div2}}.$$

A second (positive) input 242 of the error amplifier 238 receives a reference voltage $V_{ref}$ from a positive terminal of a reference node 244. The reference node 244 is modeled in FIG. 2A as a voltage source. A negative terminal of the reference node 240 (voltage source) is connected to ground 204. An output of the error amplifier 238 is connected to an input of the peak current control logic 239. As described above, a first output of the peak current control logic 239 is connected to the gate of the HSD FET 212. A second output of the peak current control logic 239 is connected to the gate of the LSD FET 210.

An outer voltage loop of the boost converter 200 includes the LSD FET 210 and the HSD FET 212, the isolation FET 220, the voltage divider 240, the error amplifier 238, and the peak current control logic 239. The peak current control logic 239 controls switch timing of the LSD FET 210 and the HSD FET 212 in response to comparison by the error amplifier 238 between the error amplifier's 238 first input 236 and its second input 242. Accordingly, $V_{out}$ is regulated to a target value by the outer voltage loop in response to this comparison, as further described with respect to FIGS. 2B and 2C.

Example embodiments may improve upon certain boost converter limitations. Specifically, the boost function of a boost converter is referred to as its conversion ratio M(D), and is expressed as a relationship between its output and input voltages per the following Equation 1:

$$M(D) = \frac{V_{out}}{V_{in}} \qquad \text{Equation 1}$$

However, the conversion ratio M(D) also can be constrained by a time period $T_{on}$(min), the minimum required charge time of its inductor (e.g., the inductor 206 in FIG. 2A). Particularly, $T_{on}$(min) can be established (or dictated) by required rising and falling times of certain nodes within the boost converter as well as the blanking time during which the inductor has neither a charging or discharging path (for example, when both the LSD FET 210 and the HSD FET 212 are off). Since these considerations may create the lower limit duration on $T_{on}$(min), the limit also affects the converter duty cycle, as the two are related per the following Equation 2:

$$D = \frac{T_{on}}{\text{period}} = T_{on} * F \qquad \text{Equation 2}$$

In Equation 2, period is the switching period of the converter, and F is the switching frequency of the converter. From Equation 2, as either $T_{on}$(min) is increased due to the above-noted considerations, or switching frequency F is increased based on circuit specification, then a minimum duty cycle, D(min) of the boost converter also increases, per the following Equation 3:

$$D(\text{min}) = T_{on}(\text{min}) * F. \qquad \text{Equation 3}$$

Also, in a boost converter, the duty cycle D, that is the portion of the entire operational period during which the inductor 206 is charged, can be written in terms as shown in the following Equation 4:

$$D = 1 - \frac{V_{in}}{V_{out}} = 1 - \frac{1}{M(D)} \qquad \text{Equation 4}$$

Rearranging Equation 4 in terms of M(D) and substituting Equation 1 in for $V_{out}/V_{in}$, provides the following Equation 5 for the conversion ratio:

$$M(D) = \frac{V_{out}}{V_{in}} = \frac{1}{1 - D} \qquad \text{Equation 5}$$

Equation 5 also establishes a corresponding minimum conversion ratio per the following Equation 6:

$$M(D)(\min) = \frac{1}{1 - D(\min)}.\qquad\text{Equation 6}$$

Accordingly, Equation 3 demonstrates that when either of $T_{on}(\min)$ or F increase, then $D(\min)$ increases, and Equation 6 demonstrates that when $D(\min)$ increases, $M(D)(\min)$ also increases. Given the preceding, an increase in either $T_{on}(\min)$ or F imposes a minimum limit on $M(D)$. Conversely, because $M(D)$ is the ratio of $$\frac{V_{out}}{V_{in}},$$

then as Vin increases (or $V_{out}$ decreases), $M(D)$ tends to decrease, and such a decrease may become problematic if the decreasing value approaches $M(D)(\min)$. In other words, as the values of $V_{in}$ and $V_{out}$ converge, reducing $M(D)$ below $M(D)(\min)$, the boost converter may not properly deliver the targeted output voltage, particularly at higher frequencies or a relatively high value of $T_{on}(\min)$.

An example embodiment may improve upon the above considerations by configuring the boost converter 200 signal path to $V_{out}$ so as to alter the direct relationship of $V_{in}$ and $V_{out}$ to $M(D)$, as $V_{in}$ approaches $V_{out}$. Particularly, the boost converter 200 provides the additional voltage of $V_{med}$ at the intermediate node 214, which is isolated from the output terminal 226 of the boost converter 200, so as to counteract the effect that otherwise would occur were $V_{in}$ and $V_{out}$ to converge. The value of $V_{med}$ is established and maintained by the inner voltage control loop that includes the regulation amplifier 218, which responds to the value of $V_{med}(\min)$. Accordingly, an example embodiment establishes $V_{med}(\min)$ to likewise establish $V_{med}$. Particularly, Equation 6 also demonstrates, when considered in terms of minima, that the minimum output voltage of an example boost converter is described by the following Equation 7:

$$V_{out}(\min) \geq \frac{V_{in}}{1 - D(\min)}\qquad\text{Equation 7}$$

Solving Equation 7 for $V_{in}$ gives the following Equation 8:

$$V_{in} \leq V_{out}(\min)*(1-D(\min))\qquad\text{Equation 8}$$

Equation 8 thus provides a desirable relationship between $V_{in}$ and $V_{out}$, which can take into account $D(\min)$ as affected by frequency. To satisfy this relationship, in an example embodiment, $V_{med}(\min)$ is generated so it equals the nominal output voltage $V_{out}(\min)$ that would occur at the nominal minimum conversion ratio of the boost converter 200, as per the following Equation 9 which rearranges Equation 8 and is also expressed in terms of Equation 6:

$$V_{med}(\min) = V_{in}*M(D)(\min) = \frac{V_{in}}{1 - D(\min)}\qquad\text{Equation 9}$$

Figure 2B:
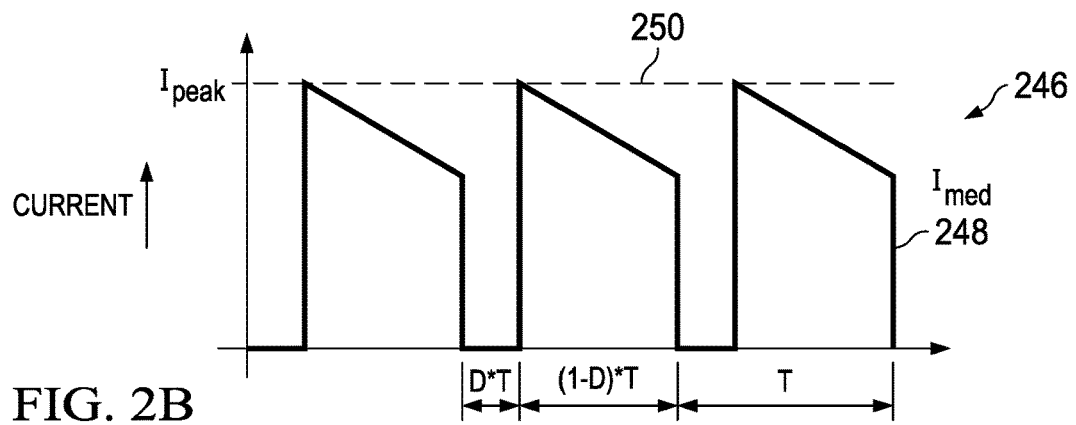
FIG. 2B shows an example graph illustrating current versus time of $I_{med}$ through the intermediate node in the boost converter of FIG. 2A.

FIG. 2B shows an example graph 246 illustrating current versus time of $I_{med}$ through the intermediate node 214 in the boost converter 200 of FIG. 2A. The duty cycle D is the portion of the switching period T of the converter during which the LSD FET 210 is on. Accordingly, the indicated time D*T is the amount of time during a single period of the converter during which the LSD FET 210 is on while the HSD FET 210 is off, and the indicated time D*(1−T) is the amount of time in a single period of the converter during which the HSD FET 210 is on while the LSD FET 210 is off. When the LSD FET 210 is on and the HSD FET 212 is off, $I_{med}$ 248 equals zero. When the LSD FET 210 is off and the HSD FET 212 is on, $I_{med}$ 248 equals the current across the inductor 206. Current through the inductor 206 is further described with respect to FIG. 2C. $I_{peak}$ 250 is a peak current through the HSD FET 212.

The peak current control logic 239 turns the LSD FET 210 on after it turns the HSD FET 212 off so that current does not flow from the intermediate node 214 to ground 204 via the LSD FET 210. In some examples, the HSD FET 212 can be replaced by a diode oriented to let current pass from node SW 208 to the intermediate node 214. (A diode in place of the HSD FET 212 is also referred to herein as a current regulator.) In some examples, the HSD FET 212 enables higher efficiency than replacing the HSD FET 212 with a diode due to a relatively low on resistance of the HSD FET 212.

Figure 2C:
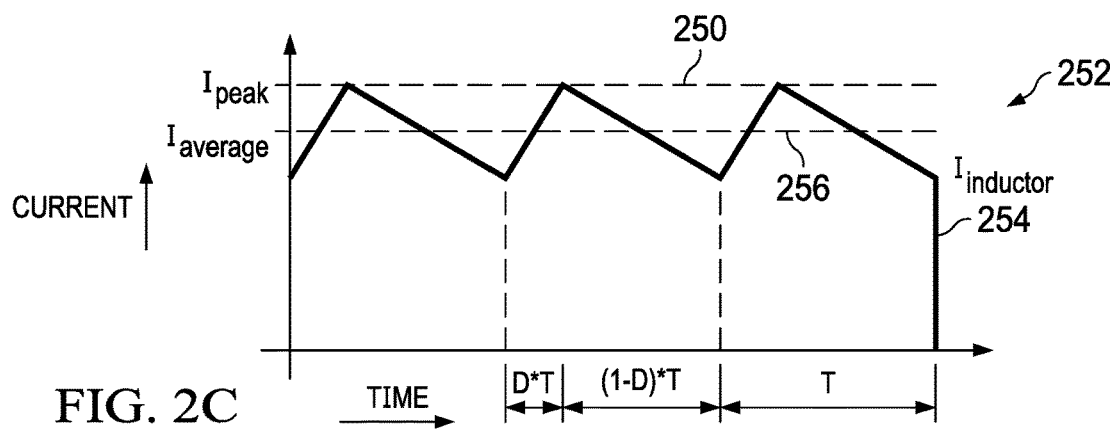
FIG. 2C shows an example graph illustrating current versus time of current through the inductor in the boost converter of FIG. 2A.

FIG. 2C shows an example graph 252 illustrating current versus time of current through the inductor 206 in the boost converter 200 of FIG. 2A. $I_{inductor}$ 254 is current through the inductor 206. $I_{average}$ 256 is an average current through the inductor 206. $I_{inductor}$ 254 increases when the LSD FET 210 is on and the HSD FET 212 is off, in that current flows through the inductor 206 (and stores energy in a corresponding magnetic field), through the LSD FET 210, to ground 204. $I_{inductor}$ 254 decreases when the LSD FET 210 is off and the HSD FET 212 is on, in that current from the stored magnetic field energy flows through the inductor 206, through the HSD FET 212 and the isolation FET 220, to the output terminal 226 of the boost converter 200. The peak current control logic 239 controls the boost converter 200 duty cycle by periodically turning on one or the other of the LSD FET 210 and the HSD FET 212, while turning the other off, in response to a comparison by the error amplifier 238 between $V_{FB}$ and $V_{ref}$ (the error amplifier's 238 first and second inputs 236 and 242, respectively).

$V_{out}$ is a voltage drop corresponding to an average of the current $I_{isofet}$ through the resistor $R_{load}$ 230, accordingly, $V_{out}=I_{isofet}(\text{average})*R_{load}$. $I_{med}$ is filtered by $C_{med}$ 212 and $I_{isofet}$ is filtered by $C_{load}$ 232, smoothing the current across $R_{load}$ 230 to more closely approximate an average of $I_{isofet}$. In some examples, the current through the voltage divider 240 is relatively small, such as less than 0.1% of $I_{isofet}$, because of the relatively large resistance of the voltage divider 240, so that the current through the voltage divider 240 can be ignored. $V_{FB}$, the output of the voltage divider 240, is proportional to $V_{out}$ and $I_{isofet}$ (as disclosed above), and is related to $I_{peak}$ 250. The peak current control logic 239 increases or decreases the duty cycle D to maintain an average $I_{isofet}$ that will produce the value of $V_{out}$ selected by $V_{ref}$. The peak control logic 239 adjusts D in response to $V_{out}$ (corresponding to an $I_{peak}$ 250) sensed by the error amplifier 238 using $V_{FB}$. The selected value of $V_{out}$ (and the corresponding $I_{peak}$ 250) is selected by the value of $V_{ref}$. Accordingly, the outer voltage loop modulates $I_{peak}$ 250 so that $V_{out}$ reaches the target value. Put differently, the error amplifier 238 senses $I_{isofet}$ using $V_{FB}$, and uses this information to generate a control signal for the peak current control logic 239 to drive the LSD FET 210 and the HSD FET 212. In example embodiments, the peak current control logic 239 is a pulse width modulation (PWM) comparator.

The error amplifier 238 controls the peak current control logic 239 to set a duty cycle for the LSD FET 210 according to the reference voltage $V_{ref}$. Accordingly, $V_{ref}$ determines the amount of energy transferred across the inductor 206, which controls $I_{med}$, which controls $V_{out}$. As described above, the feedback voltage $V_{FB}$ tracks $V_{out}$ divided down by the voltage divider 240. If $V_{FB}$ is higher than $V_{ref}$ (indicating that $V_{out}$ is higher than the target), then the error amplifier 238 controls the peak current control logic 239 to decrease the peak inductor current $I_{peak}$ by reducing the duty cycle D, which leads to a decrease in $I_{isofet}$, $V_{out}$, and $V_{FB}$. If $V_{FB}$ is lower than $V_{ref}$ (indicating that $V_{out}$ is lower than the target), then the error amplifier 238 controls the peak current control logic 239 to increase the peak inductor current $I_{peak}$ by increasing D, which leads to an increase in $I_{isofet}$, $V_{out}$, and $V_{FB}$. Accordingly, $V_{out}$ is regulated by modulating the peak inductor current, and $$D = \frac{V_{med} - V_{in}}{V_{med}} = 1 - \frac{1}{V_{med}/V_{in}}$$

(similar to Equation 4, above).

Figure 3:
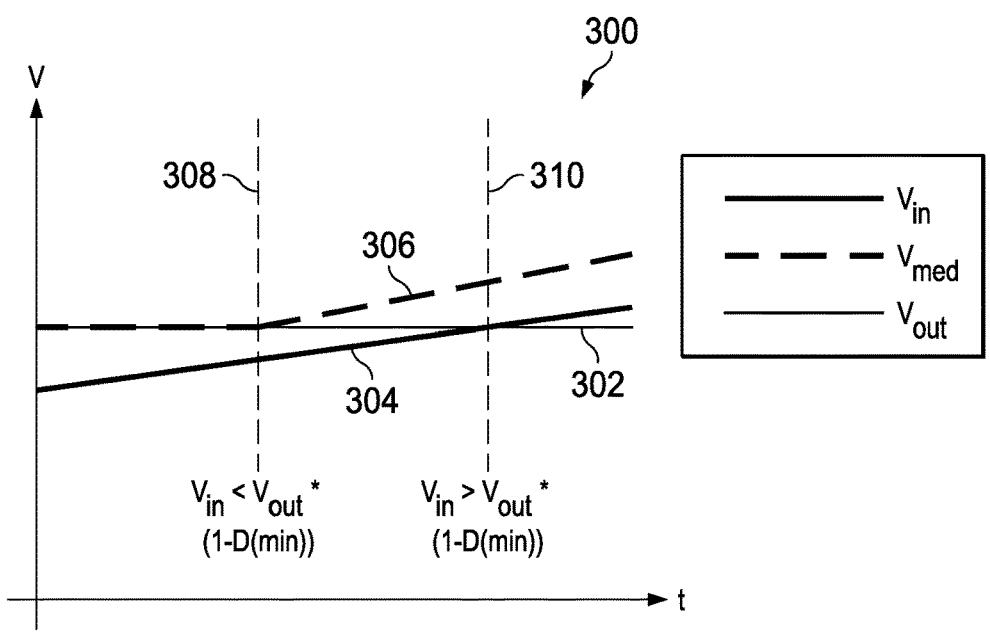
FIG. 3 shows an example voltage-time diagram for the boost converter of FIG. 2.

Returning to FIG. 2A, and as further disclosed with respect to FIG. 3, the inner voltage control loop is operable to selectively alter the $V_{out}$ drive path if $V_{in}$ and $V_{out}$ converge to the point that $$M(D) = \frac{V_{out}}{V_{in}}$$

reaches or drops below M(D)(min). Particularly, when M(D), given the then existing $V_{in}$ and nominal $V_{out}$, is greater than M(D)(min), the isolation FET 220 is controlled by the regulation amplifier 218 to be activated in a linear region so as to operate as a switch, in which case $V_{out}=V_{med}$ (min) (ignoring any negligible drop across the isolation FET 220). However, when the conversion ratio M(D), given the then existing $V_{in}$ and nominal $V_{out}$, would be less than the minimum conversion ratio M(D)(min), the isolation FET 220 is controlled by the regulation amplifier 218 to be activated in a saturation region so as to operate as a voltage-controlled resistor. In the saturation region, the minimum conversion ratio M(D)(min) may still apply as between $V_{in}$ and $V_{med}$(min) and thus also to $V_{med}$. However, any excess voltage in $V_{med}$ arising from M(D)(min), that is above $V_{out}$ as determined by $V_{ref}$ at the reference node 244, is dropped across the isolation FET 220 and therefore is not included in $V_{out}$. Accordingly, the ratio of the then-existing $V_{out}$ to $V_{in}$ is less than M(D)(min). This enables the desired $V_{out}$ to be achieved externally, notwithstanding that its ratio to $V_{in}$ is below M(D)(min).

The isolation FET 220 is activated in the linear region when $V_{GS}>V_{TH}$ and $V_{DS}<V_{GS}-V_{TH}$, where $V_{GS}$ is the gate-source voltage of the isolation FET 220, $V_{DS}$ is the drain-source voltage of the isolation FET 220, and $V_{TH}$ is the threshold voltage of the isolation FET 220. The isolation FET 220 is activated in the saturation region when $V_{GS}>V_{TH}$ and $V_{DS} \geq V_{GS}-V_{TH}$. (The linear region can also be thought of as the isolation FET 220 being fully on, and the saturation region can also be thought of as the isolation FET 220 being partially on.) Also, $V_{DS}$ $V_{med}-V_{out}$. Accordingly, the resistance of the linear region isolation FET 220 is relatively low (usefully, very low, so that transmission behavior can be considered to be similar to a wire) when the conversion ratio M(D) is greater than the minimum conversion ratio M(D)(min), and $V_{med}$ equals $V_{out}$. However, the equivalent resistance of the saturation region isolation FET 220 is relatively high when the conversion ratio M(D) is less than the minimum conversion ratio M(D)(min), so that the current $I_{isofet}$ is conducted through the isolation FET 220 with a voltage drop across the isolation FET 220 equal to $V_{med}$ minus $V_{out}$. Accordingly, the equivalent resistance of the isolation FET 220 when operating in the saturation region is $$R_{FET} = \frac{V_{med} - V_{out}}{I_{isofet}}.$$

The voltage drop across the isolation FET 220 wastes some energy, but enables an effective conversion ratio M(D) less than the minimum conversion ratio M(D)(min).

When the conversion ratio M(D) is less than the minimum conversion ratio M(D)(min), the resistive behavior of the isolation FET 220 isolates the intermediate node 214 from the output terminal 226 of the boost converter 200. This enables the boost converter 200 to treat $V_{med}$ as if it were the output voltage of a traditional boost converter, while the additional voltage drop across the saturation region isolation FET 220 enables $V_{out}$ to be lower than $V_{in}*M(D)(min)$. Further, by setting $V_{med}$ to $V_{med}$(min) when M(D) is less than M(D)(min), the amount of energy wasted by the voltage drop across the isolation FET 220 is minimized—accordingly, $V_{med}$ minus $V_{out}$ (which equals the drain-source voltage of the isolation FET 220) is minimized.

Some boost converters experience inefficiency or performance inconsistency at relatively low duty cycles or conversion ratios. In contrast, the boost converter 200 of FIG. 2 enables efficient fixed frequency conversion with a small $V_{in}$ to $V_{out}$ conversion ratio. For example, $V_{out}=5V$ and $V_{in}>4.5V$, at a 2.2 MHz switching frequency, with a 10% duty cycle.

FIG. 3 shows an example voltage-time diagram 300 for the boost converter 200 of FIG. 2. The vertical scale is voltage (V), and the horizontal scale is time (t). $V_{out}$ 302 is the voltage at the output terminal 226 of the boost converter 200. $V_{out}$ 302 is held constant to help clarify explanation, while $V_{in}$ 304 varies, and $V_{med}$ 306 changes in dependence on $V_{in}$ 304, per Equation 9, above. The behavior of the regulation amplifier 218 transitions from passive voltage sensing to active voltage regulation at a first vertical dotted line 308, which occurs when $V_{med}$(min)=$V_{out}+I_{isofet}*R_{DS}$, where $R_{DS}$ is the drain-source on resistance of the isolation FET 220. If $R_{DS}$ is assumed to be negligibly small, then at the first vertical dotted line 308, $V_{in}=V_{out}*(1-D(min))$, so that M(D)=M(D)(min).

To the left of the first vertical dotted line 308, the conversion ratio M(D) is greater than the nominal minimum boost converter conversion ratio M(D)(min):M(D)>M(D)(min). In this portion of the voltage-time diagram 300, $V_{in}$ 304 is relatively low compared to $V_{out}$ 302, so that $V_{in}<V_{out}*(1-D(min))$, which causes $V_{med}>V_{med}$(min). In this case, the regulation amplifier 218 generates iso_gate to activate the isolation FET 220 in a linear behavior region so that it acts as a resistor with small impedance. Accordingly, iso_gate=$V_{out}+V_{GS}$, where $V_{GS}$ is the gate-source voltage of the isolation FET 220. This results in $V_{med}$ $V_{out}$. $V_{GS}$ can be, for example, 5 volts, in which case iso_gate=$V_{out}+V_{GS}$ $V_{med}+5V$.

To the right of the first vertical dotted line 308, the conversion ratio M(D) is less than the nominal minimum boost converter conversion ratio M(D)(min):M(D)<M(D)(min). In this portion of the voltage-time diagram 300, $V_{in}$ 304 is relatively high compared to $V_{out}$ 302, so that $V_{in} > V_{out}*(1-D(min))$. This causes the regulation loop (the inner voltage control loop, comprising the regulation amplifier 218 and the isolation FET 220) to actively control the value Of $V_{med}$. In this case, the regulation amplifier 218 generates iso_gate to control the isolation FET 220 so that $V_{med} = V_{med}(min)$. This also means that $V_{med} > V_{out}$. Accordingly, the regulation amplifier 218 can use iso_gate to cause the isolation FET 220 to function in the saturation region, so that the value of iso_gate—adjusted by the regulation amplifier 218 in response to comparison between $V_{med}$ and $V_{med}$(min)—determines the equivalent resistance of the isolation FET 220, $$R_{FET} = \frac{V_{med} - V_{out}}{I_{isofet}}.$$

In some examples, by regulating $V_{med}$ using $V_{med}(min)$, $V_{in}$ is permitted to rise above $V_{out}$. Accordingly, step down behavior of the boost converter 200 is enabled, so that the output voltage of the boost converter 200 can be regulated to be lower than the input voltage.

In some embodiments, $V_{out}$ can be as low as zero volts ($V_{ref}$ can approach zero volts) without destabilizing the boost converter 200. In some embodiments, power dissipation across the isolation FET 220 may limit the conversion ratio. Power dissipation across the isolation FET 220 is about $(V_{in} - V_{out}) * I_{isofet}$. When the power dissipated across the isolation FET 220 is too high, the isolation FET 220 may be damaged.

Figure 4:
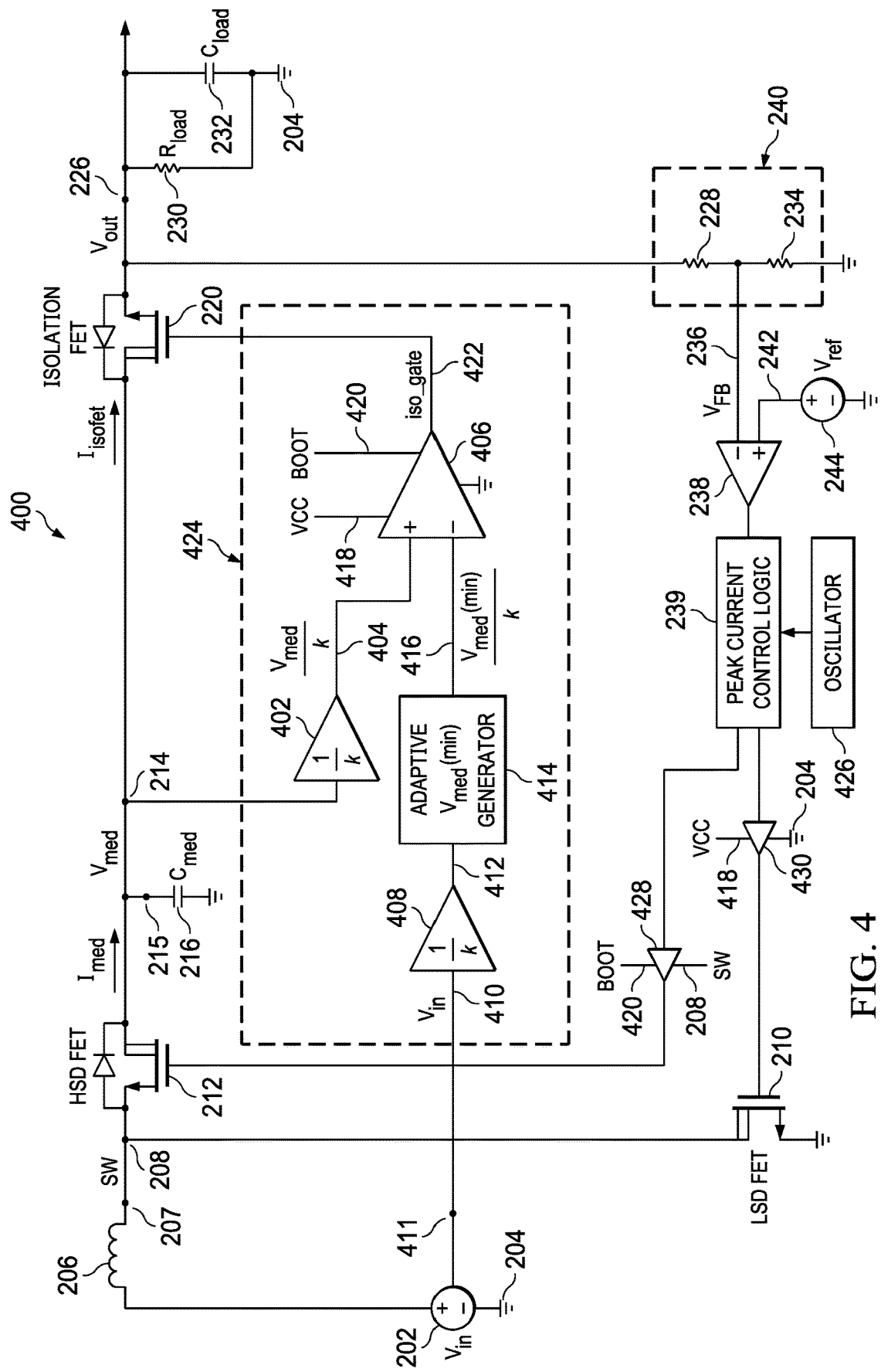
FIG. 4 shows an example circuit diagram of a boost converter with a voltage regulation circuit.

FIG. 4 shows an example circuit diagram of a boost converter 400 with a voltage regulation circuit. The boost converter 400 includes similar structures and connections to those described with respect to the boost converter 200 of FIG. 2, with similar functions. These similar structures have the same identifiers in FIG. 4 as they do in FIG. 2. In some examples, boost converter 400 is a fixed frequency boost converter, in which a switch controlling transfer of power across an inductor (such as switch 106 in the boost converter 100 of FIG. 1, and the LSD FET 210 in FIGS. 2A and 4) has a constant switching frequency and a variable duty cycle.

In some embodiments, the boost converter 400 is fabricated on an integrated circuit; except the voltage source 202 and the inductor 206 are external to the integrated circuit. The voltage source 202 connects to the integrated circuit at voltage input terminal 410, and the inductor 206 connects to the integrated circuit at inductor input terminal 207. $R_{load}$ 230 and $C_{load}$ 232 may also be external to the integrated circuit, and connect to the integrated circuit at the output terminal 226 of the boost converter 400.

The gate of the HSD FET 212 is connected to an output of a driver 428 for the HSD FET 212. The intermediate node 214 is connected to the source of the HSD FET 212, the first plate of $C_{med}$ 216 (via the capacitor terminal 215), an input of a $V_{med}$ voltage divider 402, and the drain of the isolation FET 220.

A $V_{med}$ voltage divider 402 divides $V_{med}$ by a factor of k to generate an output having voltage $$\frac{Vmed}{k}.$$

A first input 404 of a regulation amplifier 406 (a differential amplifier) is connected to an output of the $V_{med}$ voltage divider 204. A $V_{in}$ voltage divider 408 has an input 410 that receives $V_{in}$ from the voltage source 202 via a voltage input terminal 411. The $V_{in}$ voltage divider 408 divides $V_{in}$ by the factor k to generate an output having voltage $$\frac{Vin}{k},$$

which is received by an input 412 of an adaptive $V_{med}(min)$ generator 414. The $V_{med}(min)$ generator 414 generates an output having voltage $$\frac{V_{med}(min)}{k},$$

which is received as a second input 416 of the regulation amplifier 406.

The regulation amplifier 406 is connected to be powered by voltages VCC 418 and BOOT 420, and grounded by ground 204. In some embodiments, VCC 418 corresponds to a constant internal supply generated from an internal regulator (not shown), powered by $V_{in}$. (In some embodiments, VCC 418 can be powered by both $V_{in}$ and $V_{out}$.) VCC 418 is, for example, 5V. BOOT 420 is generated to equal the voltage at node SW 208 plus, for example, five volts (SW+5V). Accordingly, the regulation amplifier 406 includes two stages, with a first stage 602 powered by VCC 418, and a second stage 604 powered by BOOT 420, as further described below with respect to FIG. 6.

The regulation amplifier 406 generates an output 422 with a voltage iso_gate. The regulation amplifier 406 output 422 is connected to the gate of the isolation FET 220. The factor k is selected so that, over the range of $V_{in}$ in which the boost converter 400 operates, $$\frac{V_{in}}{k}$$

will be within an input range of the first stage 602 of the regulation amplifier 406. This enables the regulation amplifier 406 to function over the range of $V_{in}$ in which the boost converter 400 operates.

Together, the adaptive $V_{med}(min)$ generator 414, the regulation amplifier 406, the $V_{med}$ voltage divider 402, and the $V_{in}$ voltage divider 408 comprise a regulation circuit 424. The regulation circuit 424 receives $V_{in}$ and $V_{med}$ as inputs and generates iso_gate to regulate $V_{med}$ to enable continuous, efficient boost conversion when $V_{in} < V_{out}*(1-D(min))$ and when $V_{in} \geq V_{out}*(1-D(min))$; accordingly, over a conversion ratio range including values greater than, equal to, and less than M(D)(min).

Continuing with respect to FIG. 4, an oscillator 426 is connected to output a clock signal to a clock input of the peak current control logic 239. The first output of the peak current control logic 239 is connected to an input of the driver 428 for the HSD FET 212. The driver 428 for the HSD FET 212 has a high voltage BOOT 420, and a low voltage corresponding to the voltage at node SW 208. A driver 430 for the LSD FET 210 has a high voltage VCC 418 and a low voltage connected to ground 204. As previously described, the driver 428 for the HSD FET 212 has an output connected to bias the HSD FET 212. The driver 430 for the LSD FET 210 has an output connected to bias the LSD FET 210.

Figure 5A:
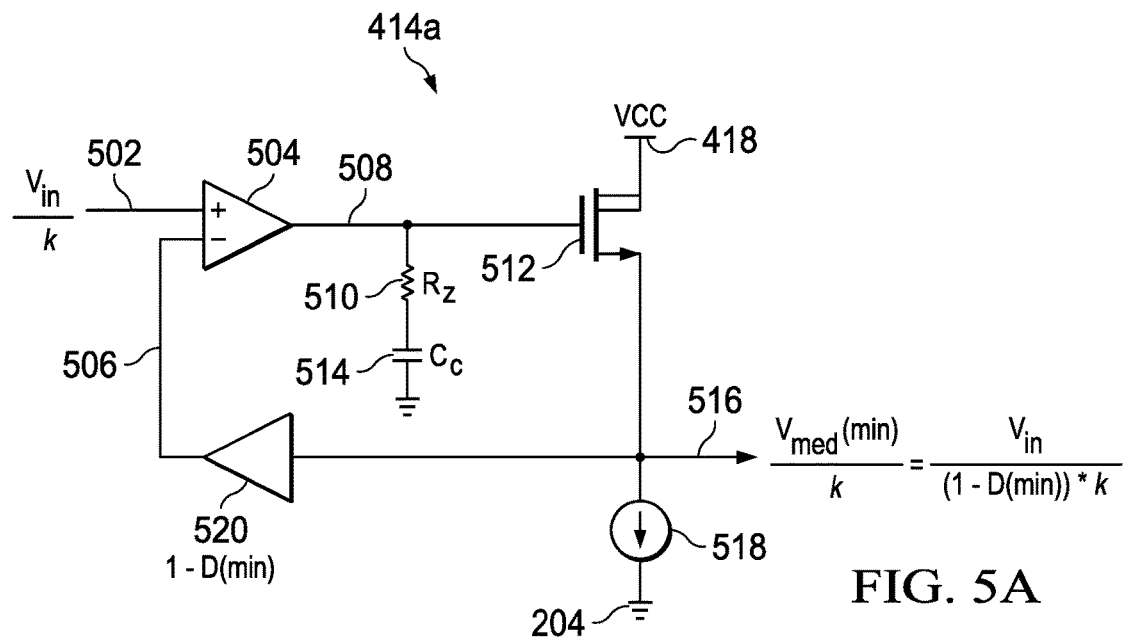
FIG. 5A shows an example circuit diagram of the adaptive $V_{med}(min)$ generator used in the boost converter of FIG. 4.

FIG. 5A shows an example circuit diagram of the adaptive $V_{med}(\min)$ generator 414a used in the boost converter 400 of FIG. 4. A first example circuit diagram corresponding to the adaptive $V_{med}(\min)$ generator 414 is identified in FIG. 5A as the adaptive $V_{med}(\min)$ generator 414a. A second example circuit diagram corresponding to the adaptive $V_{med}(\min)$ generator 414 is identified in FIG. 5B as the adaptive $V_{med}(\min)$ generator 414b.

$$\frac{V_{in}}{k}$$

is received by a first input 502 of a differential amplifier 504. The differential amplifier 504 has a second input 506 and an output 508. The output is connected to a first terminal of a loop resistor $R_Z$ 510 and is connected to bias an n channel loop transistor 512. A second terminal of $R_Z$ 510 is connected to a first plate of a compensation capacitor Cc 514. A second plate of Cc 514 is connected to ground 204. A drain of the loop transistor 512 is connected to receive VCC 418 as an input voltage powering the adaptive $V_{med}(\min)$ generator 414. A source of the loop transistor 512 is connected to a $V_{med}(\min)$ output node 516. When the loop is stable, the voltage at the $V_{med}(\min)$ output node 516 is $$\frac{V_{med}(\min)}{k} = \frac{V_{in}}{(1 - D(\min)) * k}.$$

The $V_{med}(\min)$ output node 516 is connected to a node modeled as a current source 518, which is connected to ground 204. The $V_{med}(\min)$ output node 516 is also connected to an input of a voltage attenuator 520. An output of the voltage attenuator 520 is connected to the second input 506 of the differential amplifier 504.

The voltage attenuator 520 outputs a signal with a voltage equal to the voltage received by the input of the voltage attenuator 520 multiplied by 1−D(min). If the voltage at the $V_{med}(\min)$ output node 516 equals $$\frac{V_{med}(\min)}{k},$$

then the voltage received by the second input of the voltage attenuator 520 is:

$$\frac{V_{med}(\min)}{k} * (1 - D(\min)) = \frac{V_{in} * (1 - D(\min))}{(1 - D(\min)) * k} = \frac{V_{in}}{k}$$

In this case, there is no differential between the first and second inputs 502 and 506 of the differential amplifier 504, and the loop is stable. If the voltage at the $V_{med}(\min)$ output node 516 is greater than $$\frac{V_{med}(\min)}{k},$$

then the differential amplifier 504 controls the loop transistor 512 to lower the voltage at the $V_{med}(\min)$ output node 516. Similarly, if the voltage at the $V_{med}(\min)$ output node 516 is less than $$\frac{V_{med}(\min)}{k},$$

then the differential amplifier 504 controls the loop transistor 512 to increase the voltage at the $V_{med}(\min)$ output node 516.

Figure 5B:
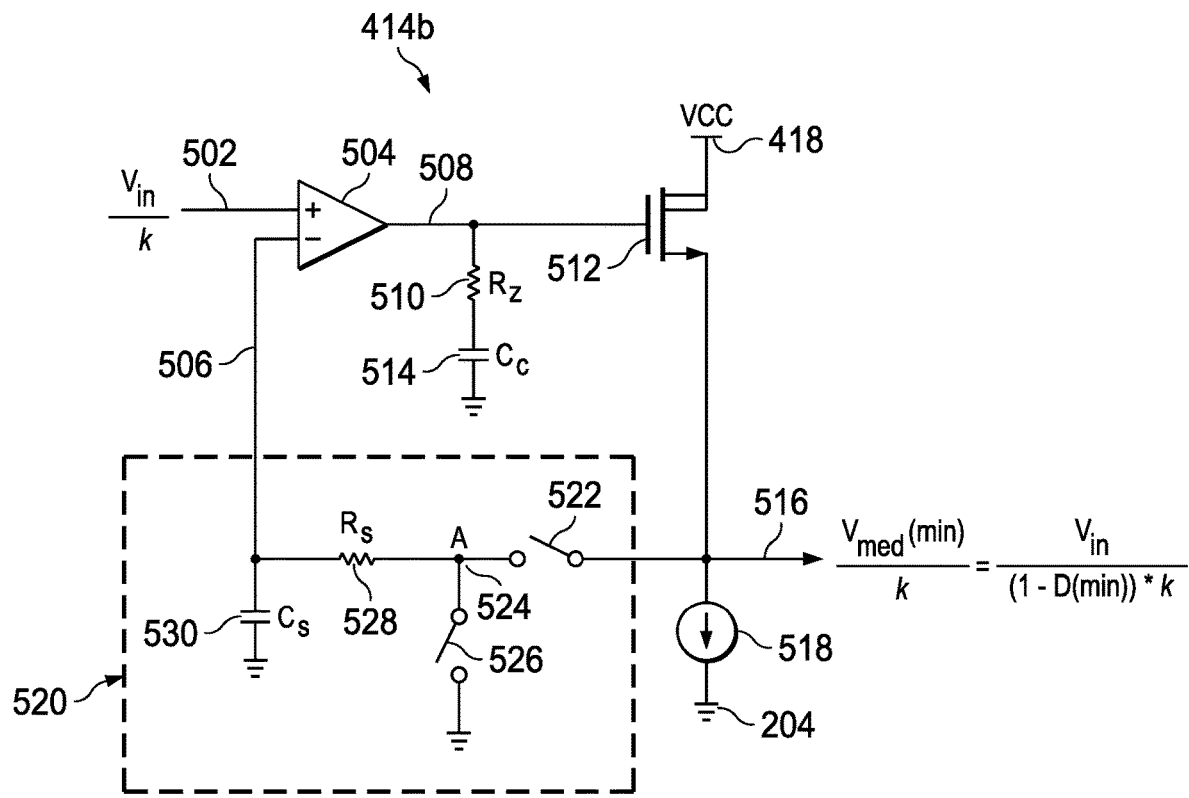
FIG. 5B shows an example circuit diagram of the adaptive $V_{med}(min)$ generator used in the boost converter of FIG. 4.

FIG. 5B shows an example circuit diagram 414b of the adaptive $V_{med}(\min)$ generator 414 used in the boost converter 400 of FIG. 4. In particular, the adaptive $V_{med}(\min)$ generator 414b shown in FIG. 5B shows an example embodiment of the voltage attenuator 520. The $V_{med}(\min)$ output node 516 is connected to a first pole of a first switch 522. A second pole of the first switch 522 is connected to a node A 524. Node A 524 is connected to a first pole of a second switch 526, and to a first terminal of a switch resistor $R_S$ 528. A second terminal of $R_S$ 528 is connected to a first plate of a switch capacitor $C_S$ 530, and to the second input of the differential amplifier 504. A second plate of the switch capacitor $C_S$ 530 is connected to ground 204. The first switch 522 and the second switch 526 are clocked by a clock signal CLK(min). Together, $R_S$ 528 and $C_S$ 530 comprise an RC filter that filters the switching frequency of the first and second switches 522 and 526 (further described with respect to FIG. 5C).

Figure 5C:
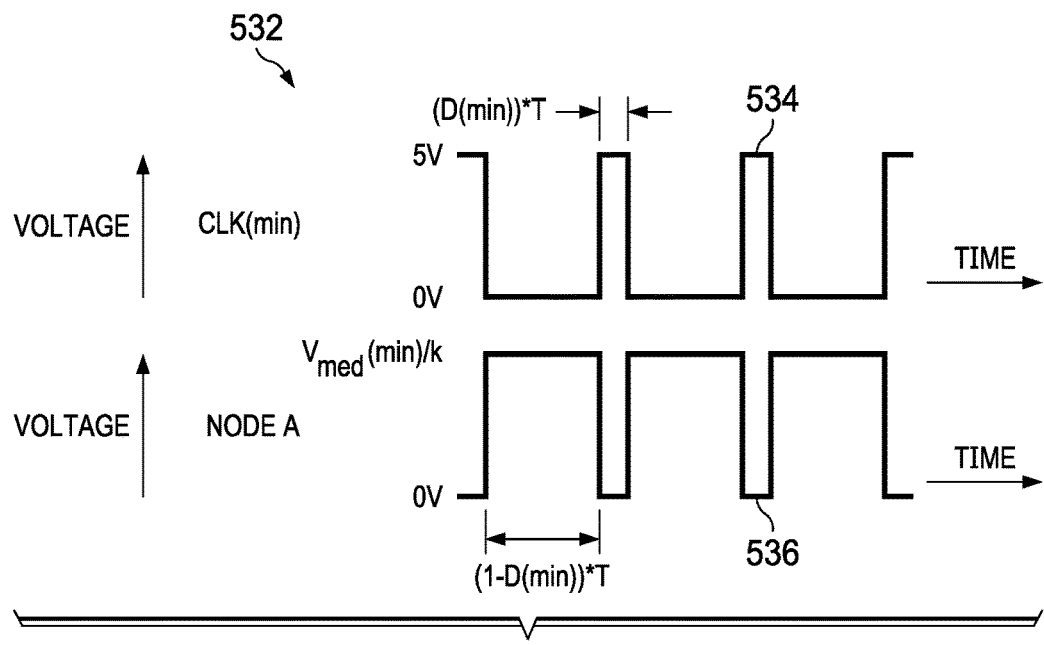
FIG. 5C shows example voltage-time graphs for CLK (min) and a voltage at node A in the adaptive $V_{med}(min)$ generator of FIG. 5B.

FIG. 5C shows example voltage-time graphs 532 for CLK(min) and a voltage at node A 524 in the adaptive $V_{med}(\min)$ generator 414b of FIG. 5B. CLK(min) 534 is a signal that partially tracks $T_{on}(\min)$ across process variations, as well as variations in voltage, temperature, and other circuit performance-affecting factors. CLK(min) 534 has a high voltage level (for example, 5V) for a duration of D(min)*T, where T is the period of the boost converter 400, during periods of conversion cycles of the boost converter 400. CLK(min) 534 has a low voltage level (for example, 0V) for a duration of (1−D(min))*T of respective periods of conversion cycles of the boost converter 400. The first switch 522 is closed when CLK(min) 534 has the low voltage level, and open when CLK(min) 534 has the high voltage level. The second switch 526 is closed when CLK (min) 534 has the high voltage level, and open when CLK(min) 534 has the low voltage level.

The voltage at node A 524 has a high voltage level of $$\frac{V_{med}(\min)}{k}$$

536 when the first switch 522 is closed and the second switch 526 is open, and has a low voltage level of zero volts when the first switch 522 is open and the second switch 526 is closed. The RC filter formed by $R_S$ 528 and $C_S$ 530 filters this oscillation-dependent variation to conform the signal more closely to a DC signal as an input to the differential amplifier 504.

Figure 6:
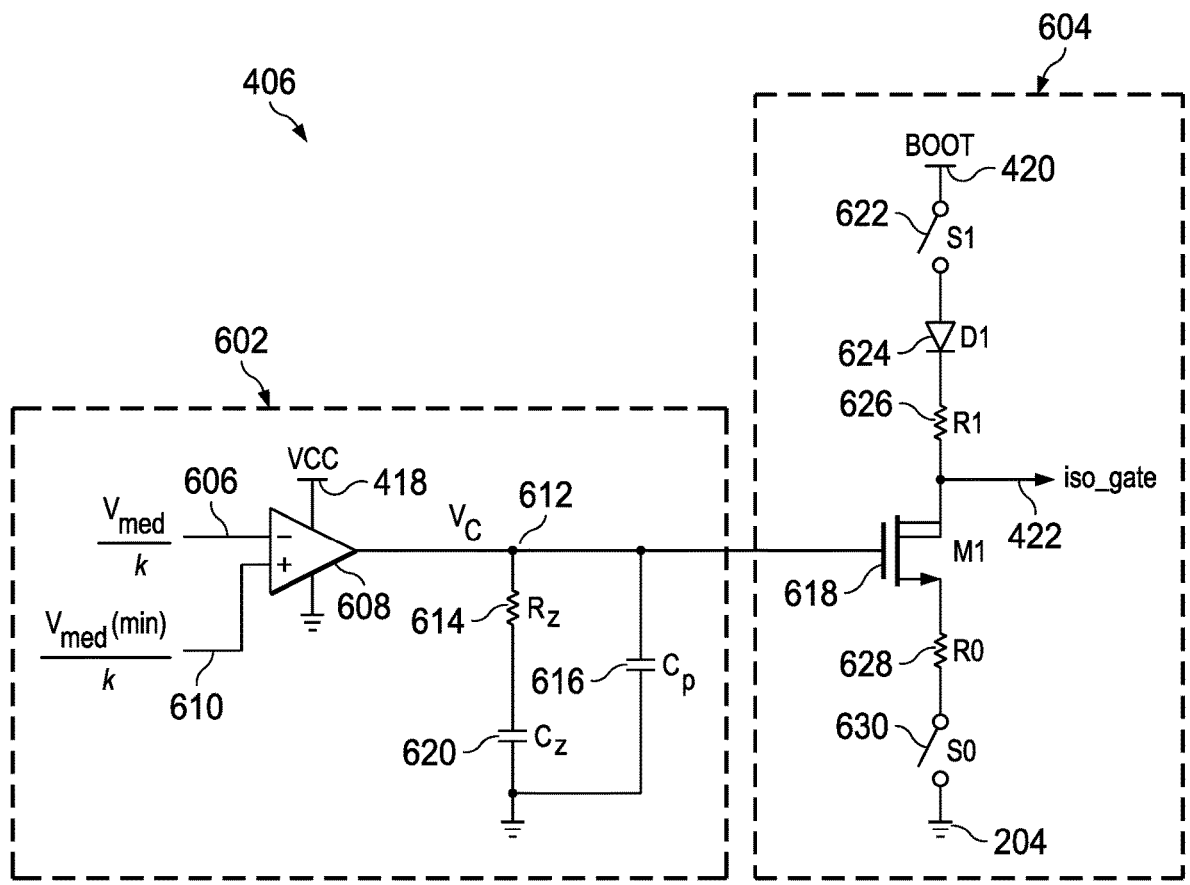
FIG. 6 shows an example circuit diagram of a regulation amplifier as used in the boost converter of FIG. 4.

FIG. 6 shows an example circuit diagram of a regulation amplifier 406 as used in the boost converter 400 of FIG. 4. The regulation amplifier 406 has a supply voltage of VCC 418 in its first stage 602, and has a supply voltage of BOOT 420 in its second stage 604. In the first stage 602, a first input 606 of a differential amplifier 608 has a voltage $$\frac{V_{med}}{k}.$$

A second input 610 of the differential amplifier 608 has a voltage $$\frac{V_{med}(\min)}{k}.$$

The differential amplifier 608 receives the supply voltage VCC 418, and is grounded by the ground 204. In some examples, the differential amplifier 608 has two stages: a transconductance stage, which receives the first and second inputs 606 and 610, and a buffer stage, which converts the supply voltage from the VCC 418 domain to the BOOT 420 domain. The differential amplifier 608 has an output connected to a node 612 having a voltage VC.

The node 612 is connected to a first terminal of a compensation resistor $R_Z$ 614 and a first plate of a first compensation capacitor CP 616, and is connected to bias an n channel transistor M1 618. A second terminal of $R_Z$ 614 is connected to a first plate of a second compensation capacitor $C_Z$ 620. A second plate of $C_Z$ 620 is connected to ground 204 and a second plate of CP 616.

In the second stage 604 of the regulation amplifier 406, the supply voltage BOOT 420 is connected to a first pole of a switch S1 622. A second pole of S1 622 is connected to an input of a diode D1 624. An output of D1 624 is connected to a first terminal of a load resistor R1 626. A second terminal of R1 626 is connected to the output 422 of the regulation amplifier 406, which has voltage iso_gate (and as described with respect to FIG. 4, is connected to bias the isolation FET 220).

The output 422 of the regulation amplifier 406 is connected to a drain of M1 618. A source of M1 is connected to a first terminal of a degenerated resistor R0 628, which decreases gain. A second terminal of R0 628 is connected to a first pole of switch S0 630. A second pole of S0 630 is connected to ground 204.

If $V_{in}$ is relatively low compared to $V_{out}$, so that M(D)>M(D)(min), then $$\frac{V_{med}}{k}$$

is relatively low, VC is pulled down, M1 618 is off, and the isolation FET 220 is activated in the linear region, so that $V_{med}=V_{out}$. D1 624 is used so that iso_gate=$V_{out}+V_{CC}-V(D1)$, where V(D1) is the voltage across D1 624. Using diode D1 624 avoids use of an additional charge pump.

When $V_{in}$ is relatively high compared to $V_{out}$, so that M(D)≤M(D)(min), then $$\frac{V_{med}}{k}$$

is relatively low, VC is pulled up, and M1 618 is on. Accordingly, the regulation loop takes effect, so that the isolation FET 220 is activated in the saturation region and $V_{med}=V_{med}(\min)$. In this case, iso_gate=$V_{out}+V_{GS}$, where $V_{GS}$ is the gate-source voltage of the isolation FET 220. ($V_{DS}$ is the drain-source voltage of the isolation FET 220, and equals $V_{med}$ minus $V_{out}$; $V_{out}$ is controlled in response to $V_{ref}$. The isolation FET 220 is in the saturation region, which means that $V_{GS}$ is determined by $I_{isofet}$, so that $V_{GS}$=gate voltage−source voltage=iso_gate−$V_{out}$. Iso_gate is the gate voltage, and $V_{out}$ is the source voltage. Iso_gate is not dependent on $V_{out}$, but it is related to $V_{out}$.) If S0 630 and S1 622 are not both on, then loop regulation is not effective. For example, if the LSD FET 210 is on, then no current flows to the isolation FET 220, the iso_gate voltage is maintained by the gate capacitance of the isolation FET 220 (capacitors resist changes in voltage), and S0 630 and S1 632 are off. If the HSD FET 212 is on, then S0 630 and S1 632 are on, and the regulation loop takes effect.

Modifications are possible in the described embodiments, and other embodiments are possible, within the scope of the claims.

In some embodiments, any of the boost converters of FIGS. 2 through 6 is implemented in CMOS (complementary metal-oxide semiconductor).

In some embodiments, a control loop other than peak current mode control is used.

In some embodiments, the HSD FET, LSD FET, and isolation FET are 20 volt n-type LDMOS FETs (laterally-diffused metal-oxide semiconductor field effect transistors).

In some embodiments, $V_{med}(\min)$ can be considered a lower bound voltage for $V_{med}$.

In some embodiments, the transition from unregulated $V_{med}$ to $V_{med}$ regulated to equal a floor voltage can occur at a floor voltage higher than $V_{med}(\min)$ (usefully, very slightly higher), according to theoretical considerations, design specifications of the boost converter, and stability and other performance parameters of the boost converter.

In some embodiments, the error amplifier turns the LSD FET on and the HSD FET off at a clock edge.

In some embodiments, the HSD FET or a diode used instead of the HSD FET is referred to herein as a current regulator.

In some examples, body diodes of MOSFETS are oriented differently than described above.

What is claimed is:

1. An integrated circuit, comprising:
   a current regulator including a current regulator input and a current regulator output, wherein the current regulator is configured to allow current to flow from the current regulator input to the current regulator output, and not from the current regulator output to the current regulator input;
   a transistor including a first terminal, a second terminal, and a control terminal, wherein the first terminal of the transistor is coupled to the current regulator output; and
   a regulation amplifier including a first regulation input coupled to the first terminal of the transistor, a second regulation input coupled to a reference voltage, and a regulation output coupled to the control terminal of the transistor, wherein:
   the regulation amplifier is configured to control the transistor to operate in a linear region in response to a comparison between an intermediate voltage at the first terminal of the transistor and the voltage having a first value;
   the regulation amplifier is configured to control the transistor to operate in a saturation region in response to the comparison between the intermediate voltage and the voltage having a second value different from the first value; and
   the voltage is responsive to the first regulation input.

2. The integrated circuit of claim 1, wherein the regulation amplifier is configured to control the transistor so that an intermediate voltage on the first terminal of the transistor is greater than or equal to the reference voltage.

3. The integrated circuit of claim 1, wherein the regulation amplifier is coupled to control a resistance between the first terminal of the transistor and the second terminal of the transistor in response to a comparison between an intermediate voltage at the first terminal of the transistor and the reference voltage.

4. The integrated circuit of claim 1, wherein either:
the current regulator is a diode; or
the current regulator is a second transistor including a body diode.

5. The integrated circuit of claim 1, further comprising:
a regulation circuit including:
an adaptive voltage generator including a first generator input coupled to the first regulation input, a generator clock input, and a generator output; and
the regulation amplifier, wherein:
the second regulation input is coupled to the generator output.

6. The integrated circuit of claim 5, wherein the adaptive voltage generator includes:
a generator transistor including a generator source, a generator drain, and a generator gate;
an attenuator including a first attenuator input coupled to the generator source and an attenuator output; and
a generator amplifier including a first generator amplifier input coupled to the first generator input, and a second generator amplifier input coupled to the attenuator output;
wherein the generator output is coupled to the generator source and the first attenuator input.

7. The integrated circuit of claim 5, wherein the regulation amplifier includes:
a regulation transistor including a regulation source, a regulation drain, and a regulation gate;
a differential amplifier including a first input that is the first regulation input and a second input that is the second regulation input, and an output coupled to bias the regulation transistor;
a regulation amplifier source adapted to receive an amplifier source voltage;
a regulation diode including an input and an output, the regulation diode input coupled to the regulation amplifier source;
a regulation resistor including a first terminal and a second terminal, the first terminal coupled to the regulation diode output;
an output that is the regulation output; and
the regulation output is coupled to the second terminal of the regulation resistor and to the regulation transistor drain.

8. The integrated circuit of claim 1, further comprising:
a capacitor including a first plate and a second plate;
wherein the first plate is coupled to the first terminal of the transistor, and the second plate is coupled to a ground terminal.

9. The integrated circuit of claim 1, wherein:
an inductor includes a first terminal and a second terminal;
the first terminal of the inductor is coupled to a voltage source; and
the second terminal of the inductor is coupled to an inductor input terminal.

10. An integrated circuit comprising:
a voltage input terminal adapted to couple to a voltage source adapted to provide an input voltage;
an inductor input terminal adapted to couple to a terminal of an inductor;
a switch including a first switch terminal and a second switch terminal, wherein the second switch terminal is adapted to be coupled to a ground;
a diode including a diode input and a diode output, wherein the diode input is coupled to the first switch terminal and to the inductor input terminal;
an output terminal; and
a resistive element including a first resistive element terminal and a second resistive element terminal, wherein the first resistive element terminal is coupled to the diode output, wherein the second resistive element terminal is coupled to the output terminal, wherein a resistance of the resistive element is responsive to a comparison between an intermediate voltage at the first resistive element terminal and a minimum intermediate voltage based on the input voltage from the voltage source, and wherein the resistive element is controlled by a regulator circuit including:
a first divider coupled to the voltage source;
a generator circuit coupled to an output of the first divider;
a second divider coupled to the intermediate voltage; and
a comparator including a first input terminal coupled to an output of the second divider, a second input terminal coupled to an output of the generator circuit, and an output coupled to the resistive element.

11. The integrated circuit of claim 10, further comprising:
a second transistor, wherein the diode is a body diode of the second transistor; and
a third transistor, wherein the switch is the third transistor.

12. The integrated circuit of claim 10, wherein the minimum intermediate voltage is responsive to a minimum duty cycle.

13. The integrated circuit of claim 11,
wherein the resistive element is configured to have a minimum resistance of the resistive element in response to the intermediate voltage being greater than the minimum intermediate voltage; and
wherein the resistive element is configured to have a resistance responsive to the intermediate voltage, a voltage of the output terminal, and a current through the resistive element, in response to the intermediate voltage being less than the minimum intermediate voltage.

14. A voltage controlled system, comprising:
an inductor having a first terminal and a second terminal;
a voltage input terminal adapted to couple to a voltage source adapted to provide an input voltage, the voltage input terminal coupled to the first terminal of the inductor;
a current regulator including a current regulator input and a current regulator output, wherein the current regulator input is coupled to the second terminal of the inductor, and wherein the current regulator is configured to allow current to flow from the current regulator input to the current regulator output, and not from the current regulator output to the current regulator input;
a transistor including a first terminal, a second terminal, and a control terminal, wherein the first terminal is coupled to the current regulator output;
a regulation circuit including:
a first regulation input coupled to receive the input voltage;
a second regulation input coupled to the current regulator output;
a regulation output coupled to the control terminal of the transistor;

an amplifier having a first amplifier input coupled to the current regulator output, a second amplifier input, and an amplifier output coupled to the regulation output; and an adaptive voltage generator having a first generator input coupled to the first regulation input, a generator clock input, and a generator output, wherein the adaptive voltage generator includes:

a generator transistor having a generator source, a generator drain, and a generator gate; and an attenuator having a first attenuator input coupled to the generator source and an attenuator output; and a device coupled to receive an output voltage from the second terminal of the transistor.

15. The voltage controlled system of claim 14, wherein:
the amplifier is a regulation amplifier;
the amplifier output is a regulation amplifier output; and
the second amplifier input is coupled to the generator output.

16. The voltage controlled system of claim 15, wherein the adaptive voltage generator includes:

a generator amplifier having a first generator amplifier input coupled to the first generator input, and a second generator amplifier input coupled to the attenuator output;

wherein the generator output is coupled to the generator source and the first attenuator input.

17. The voltage controlled system of claim 16, wherein the regulation amplifier includes:

a regulation transistor having a regulation source, a regulation drain, and a regulation gate;

a differential amplifier having a first input that is the first amplifier input and a second input that is the second amplifier input, and an output coupled to bias the regulation transistor;

a regulation amplifier source adapted to receive an amplifier source voltage;

a regulation diode having an input and an output, the regulation diode input coupled to the regulation amplifier source;

a regulation resistor having a first terminal and a second terminal, the first terminal coupled to the regulation diode output;

an output that is the regulation amplifier output; and the regulation amplifier output is coupled to the second terminal of the regulation resistor and to the regulation transistor drain.

18. The voltage controlled system of claim 16, wherein the regulation amplifier is a differential amplifier.

19. The voltage controlled system of claim 14, further comprising:

a ground terminal having a ground voltage; and a capacitor having a first plate and a second plate;

wherein the first plate is coupled to the current regulator output, and the second plate is coupled to the ground terminal.

* * * * *